United States Patent Office 2,912,357
Patented Nov. 10, 1959

2,912,357
AMINOALKYLTHIAZOLES

Marion W. Harman and John J. D'Amico, Nitro, W. Va., assignors to Monsanto Chemical Company, St. Louis, Mo., a corporation of Delaware No Drawing. Application March 29, 1956
Serial No. 574,623

12 Claims. (Cl. 167—33)

The present invention relates to new chemical products and to the uses of said products as fungicides, especially for control of wheat rust. More particularly, the invention relates to new thiazoles and specifically to a plurality of new derivatives of arylene thiazoles, preferably mercapto arylene thiazoles. In general, the derivatives may be described as aminoalkyl thiazoles. The alkyl group is limited to one containing at least two carbon atoms in a straight chain but it is within the scope of the invention to replace one or more hydrogen atoms by lower alkyl groups. Moreover, one or two hydrogens of the benzene nucleus of the mercaptobenzothiazole nucleus may be replaced by another benzene nucleus or by such substituents as hydrogen, halogen, alkoxy, alkyl or aryl groups. Also, the amino group attached to the alkyl group may be primary, secondary or tertiary.

The new compounds may be most conveniently represented by the general formula $[(M-X-E)_yA]_z$ wherein M represents a carbocyclic thiazole nucleus, X is oxygen or sulfur and preferably sulfur, E represents an alkylene group containing at least two carbon atoms in a straight chain and preferably two carbon atoms, A represents the amine group and preferably a dialkylamino group and y and z are integers from 1 to 2. Typical examples of the new compounds comprise 2-(2-dimethylaminoethylthio) 4-ethylbenzothiazole,
2-(2-diethylaminoethylthio) 4-ethylbenzothiazole,
2-(2-dimethylaminoethylthio) 7-methylbenzothiazole,
2-(2-diethylaminoethylthio) 7-methylbenzothiazole,
2-(2-dimethylaminoethylthio) 4-methylbenzothiazole,
2-(2-diethylaminoethylthio) 4-methylbenzothiazole,
2-(2-dimethylaminoethylthio) 5-methylbenzothiazole,
2-(2-diethylaminoethylthio) 5-methylbenzothiazole,
2-(2-dimethylaminoethylthio) 6-methylbenzothiazole,
2-(2-diethylaminoethylthio) 6-methylbenzothiazole,
2-(2-dimethylaminoethylthio) 4-methyl - 5 - chlorobenzothiazole,
2-(2-diethylaminoethylthio) 4 - methyl - 5 - chlorobenzothiazole,
2-(2-dimethylaminoethylthio) 4-methyl - 6 - chlorobenzothiazole,
2-(2-diethylaminoethylthio) 4 - methyl - 6 - chlorobenzothiazole,
2-(2-dimethylaminoethylthio) 4-chlorobenzothiazole,
2-(2-diethylaminoethylthio) 4-chlorobenzothiazole,
2-(2-dimethylaminoethylthio) 6-chlorobenzothiazole,
2-(2-diethylaminoethylthio) 6-chlorobenzothiazole,
2-(2-dimethylaminoethylthio) 6-phenylbenzothiazole,
2-(2-diethylaminoethylthio) 6-phenylbenzothiazole,
2-(2-dimethylaminoethylthio) 4-phenylbenzothiazole,
2-(2-diethylaminoethylthio) 4-phenylbenzothiazole,
2-(2-dimethylaminoethylthio) 4,5-dimethylbenzothiazole,
2-(2-diethylaminoethylthio) 4,5-dimethylbenzothiazole,
2-(2-dimethylaminoethylthio) 4,6-dimethylbenzothiazole,
2-(2-diethylaminoethylthio) 4,6-dimethylbenzothiazole,
2-(2-dimethylaminoethylthio) 4-methoxybenzothiazole,
2-(2-diethylaminoethylthio) 4-methoxybenzothiazole,
2-(2-dimethylaminoethylthio) 5-methoxybenzothiazole,
2-(2-diethylaminoethylthio) 5-methoxybenzothiazole,
2-(2-dimethylaminoethylthio) 6-methoxybenzothiazole,
2-(2-diethylaminoethylthio) 6-methoxybenzothiazole,
2-(2-dimethylaminoethylthio) 4-methoxy-6-chlorobenzothiazole,
2-(2-diethylaminoethylthio) 4-methoxy - 6 - chlorobenzothiazole,
2-(2-dimethylaminoethylthio) 4-ethoxybenzothiazole,
2-(2-diethylaminoethylthio) 4-ethoxybenzothiazole,
2-(2-dimethylaminoethylthio) 5-ethoxybenzothiazole,
2-(2-diethylaminoethylthio) 5-ethoxybenzothiazole,
2-(2-dimethylaminoethylthio) 4,6 - dimethyl - 7 - chlorobenzothiazole,
2-(2-diethylaminoethylthio) 4,6-dimethyl-7-chlorobenzothiazole,
2-(2-dimethylaminoethylthio) 4,6-dimethyl-5,7-dichlorobenzothiazole and
2-(2-diethylaminoethylthio) 4,6-dimethyl - 5,7 - dichlorobenzothiazole.

Salts of the compounds having the aforedefined structure are also contemplated. The salts are for the most part crystalline, non hygroscopic solids. Typical examples are the salts prepared from any of the following acids: hydrochloric acid, sulfuric acid, oxalic acid, phthalic acid, benzoic acid, oleic aid, stearic acid, adipic acid and maleic acid. The method of producing the various products of the invention and the application of the products as fungicides will be understood from the following description and examples. In order to aid in describing and understanding the invention, the various products will be arranged in classes.

CLASS 1.—NON-SUBSTITUTED BENZENE NUCLEUS

Example 1

2 - (2 - dimethylaminoethylthio)benzothiazole of the structure

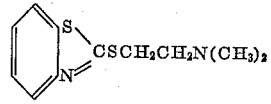

was obtained as follows: To a vessel equipped with agitating means, 216 parts (0.5 mole) of a solution of a 38.7% concentration of sodium mercaptobenzothiazole was introduced and to this were added 72 parts (0.5 mole) of 2-chloro N,N-dimethylethylamine hydrochloride and 80 parts (0.5 mole) of a 25% solution of caustic soda. The stirred mixture was then heated for 5 hours at about 50–60° C. and then cooled to about 25° C. Thereupon the mixture was extracted with about 500 parts of diethyl ether, the ether extract was washed with five successive portions of water, each of about 200 parts, or until the wash waters were neutral in reaction. The ethereal solution was then dried by suitable means, such as anhydrous sodium sulfate and the ether removed under a vacuum of 1–2 mm. pressure. An amber colored liquid was obtained which was insoluble in water and heptane but soluble in ether, acetone, chloroform, ethanol, ethyl acetate and hot benzene. Analysis gave 11.86% nitrogen and 27.36% sulfur as compared to 11.75% nitrogen and 26.90% sulfur calculated for $C_{11}H_{14}N_2S_2$.

Example 2

2-(1-methyl-2-dimethylaminoethylthio)benzothiazole of the structure

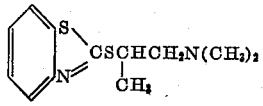

was obtained by following the procedure described in the foregoing example but employing as a reaction charge 496 parts (0.5 mole) of a 17.05% solution of sodium mercaptobenzothiazole, 79 parts (0.5 mole) of 2-methyl-2-chloro-N,N-dimethylethylamine hydrochloride and 80 parts (0.5 mole) of 25% caustic soda solution. The final product obtained again was an amber oil possessing the same solubility characteristics as the product of the first example and analyzing 11.07% nitrogen as compared to 11.10% calculated for $C_{12}H_{16}N_2S_2$.

*Example 3*

2-(2-diethylaminoethylthio)benzothiazole of the structure

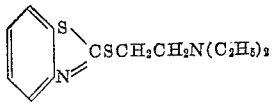

was obtained by following the detailed procedure set forth in Example 1 but employing as a reaction charge 496 parts (0.5 mole) of a 17.05% solution of sodium mercaptobenzothiazole, 86 parts (0.5 mole) of 2-chloro-N,N-diethylethylamine hydrochloride and 80 parts (0.5 mole) of 25% caustic soda solution. An amber colored liquid product was obtained possessing the same solubility characteristics as the product of Example 1. Analysis gave 10.50% nitrogen and 23.69% sulfur as compared to 10.52% nitrogen and 24.07% sulfur calculated for $C_{13}H_{18}S_2$. The hydrochloride of this example was a cream colored solid melting at 186° C. after recrystallization from methanol. M.P. $(HOOC)_2 \cdot 2H_2O$ salt 140–142° C.

*Example 4*

2-(3-dimethylaminopropylthio)benzothiazole of the structure

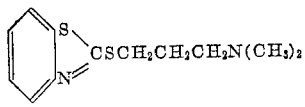

was obtained by following the detailed procedure set forth in Example 1 but employing as a reaction charge 390 parts (0.4 mole) of a 17.16% solution of sodium mercaptobenzothiazole, 63.2 parts (0.4 mole) of gamma-dimethylaminopropyl chloride hydrochloride and 64 parts (0.4 mole) of 25% caustic soda solution. An amber oil was obtained analyzing 10.61% nitrogen and 25.36% sulfur as compared to 11.10% nitrogen and 25.41% sulfur calculated for $C_{12}H_{16}N_2S_2$.

*Example 5*

2,2'-bis(2-dimethylaminoethylthio)-6,6'-dibenzothiazole of the structure

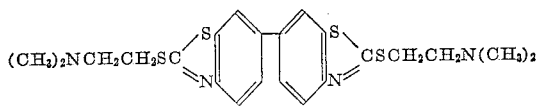

was obtained by reacting 33.2 parts (0.1 mole) of 2,2'-dimercapto-6,6'-dibenzothiazole dissolved in 500 ml. of water containing 32 parts (0.2 mole) of 25% caustic soda solution with 28.8 parts (0.2 mole) of 2-chloro N,N-dimethylethylamine hydrochloride in 32 parts (0.2 mole) of 25% caustic soda solution. The stirred mixture was then heated for 4 hours at 50–60° C., cooled to 25° C., the precipitate filtered, washed with water until neutral to litmus and air dried at room temperature. The product was a tan solid which melted, after recrystallization from dilute alcohol, at 126–128° C. Analysis gave 11.21% nitrogen and 26.63% sulfur as compared to 11.80% nitrogen and 27.01% sulfur calculated for $C_{22}H_{26}N_4S_4$. This compound controlled *Stemphylium sarcinaeforme* and *Monilinia fructicola* but was not effective against the organism causing wheat rust.

*Example 6*

2-(3-aminopropylthio)benzothiazole of the structure

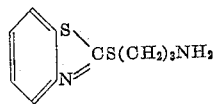

was obtained by employing as a reaction charge 246 parts (0.25 mole) of a 16.98% solution of sodium mercaptobenzothiazole, 54.7 parts (0.25 mole) of 3-bromopropylamine hydrobromine and 40 parts (0.25 mole) of 25% caustic soda. The procedure was that followed in Example 1 except that after cooling to 25° C. the reaction mixture was extracted with 300 ml. of chloroform. The chloroform solution was washed with water until the washings were neutral to litmus and dried over sodium sulfate. The chloroform was removed in vacuo at 80–90° C. The product was a cream colored solid melting at 135° C. Analysis gave 11.95% nitrogen as compared to 12.49% calculated for $C_{10}H_{12}N_2S_2$.

*Example 7*

2-(2-aminoethylthio)benzothiazole of the structure

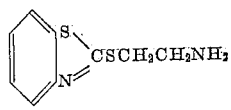

may be used as an intermediate to prepare the compound of Example 1 by condensation with formaldehyde and formic acid, a technique for converting primary to tertiary amine (see Kirby U.S. Patent 2,366,534). The intermediate was obtained by employing 190 parts (0.2 mole) of a 17.6% solution of sodium mercaptobenzothiazole, 41 parts (0.2 mole) of 2-bromoethylamine hydrobromide and 32 parts (0.2 mole) of 25% caustic soda solution. The reaction mixture was stirred at 25–30° C. for 24 hours, 200 ml. of ethyl ether then added and stirring continued for 30 minutes whereupon the product was filtered, washed with water until neutral to litmus and air dried at room temperature. A tan colored solid was obtained melting at 175–177° C. after recrystallization from methyl alcohol. Analysis gave 12.73% nitrogen and 30.63% sulfur as compared to 13.32% nitrogen and 30.49% sulfur calculated for $C_9H_{10}N_2S_2$.

*Example 8*

2,2'-(iminodiethylene)dithiobis(benzothiazole) of the structure

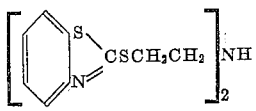

was formed by reacting 392 parts (0.4 mole) of a 17.05% solution of sodium mercaptobenzothiazole in 32 parts (0.2 mole) of 25% caustic soda solution with 35.7 parts (0.2 mole) of di(2-chlorethyl)amine hydrochloride at a temperature of 50–60° C. for about 3 hours. After cooling to about 10° C., the precipitate was separated by filtration, washed with water until the washings were neutral to litmus and then allowed to dry at room temperature. Tan colored crystals melting at 47–50° C. were obtained. The crystals were soluble in hot chloroform and hot benzene but were insoluble in other common solvents. Analysis gave 9.93% nitrogen and 30.32% sulfur compared to 10.41% nitrogen and 31.78% sulfur calculated for $C_{18}H_{17}N_3S_4$. Although not a rust eradicant, the compound was active against *Fusarium lycopersici* and *Stemphylium solani*, the causative agents of tomato wilt and tomato leaf-spot respectively.

Example 9

2-(2-diethylaminoethoxy)benzothiazole of the structure

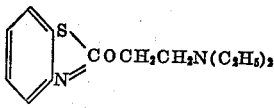

was obtained by reacting 60.5 parts (0.4 mole) of 2-hydroxy benzothiazole dissolved in 500 ml. of water containing 64 parts (0.4 mole) of 25% caustic soda solution with 68.9 parts (0.4 mole) of 2-chloro N,N-diethylethylamine hydrochloride in 64 parts (0.4 mole) of 25% caustic soda solution. The stirred reaction mixture was heated at 50–60° C. for 24 hours. After cooling to 25° C., the reaction mixture was extracted with 600 ml. of ethyl ether, the ether solution washed with two 200 ml. portions of water and then dried over sodium sulfate. The ether was removed in vacuo at 80–90° C. The product was an amber oil analyzing 10.98% nitrogen and 13.38% sulfur as compared to 11.19% nitrogen and 12.81% sulfur calculated for $C_{13}H_{18}N_2OS$.

Example 10

2-(2-dimethylaminoethoxy)benzothiazole of the structure

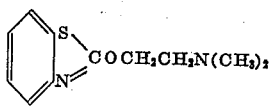

was obtained by employing the reaction charge of Example 9 except that 57.6 parts (0.4 mole) of 2-chloro N,N-dimethylethylamine hydrochloride was substituted for the 2-chloro N,N-diethylethylamine hydrochloride. The stirred reaction mixture was heated at 70–80° C. for 18 hours and then placed in a drying oven at 60° C. to remove water. The residue was filtered hot and the filtrate heated at 80–90° C. in vacuo (1–2 mm.) for 3 hours. The produce was an amber oil analyzing 14.47% sulfur as compared to 14.42% calculated for $C_{11}H_{14}N_2OS$. This compound controlled *Fusarium lycopersici* and *Stemphylium solani* but was not a rust eradicant.

Example 11

2 - (3 - dimethylaminopropoxy)benzothiazole of the structure

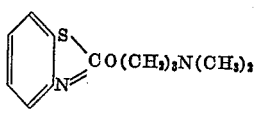

was obtained by reacting 30.0 parts (0.2 mole) of 2-hydroxy benzothiazole dissolved in 250 ml. of SD-1 alcohol containing 13.2 parts (0.2 mole) of 85% potassium hydroxide and 20 ml. of water with 31.6 parts (0.2 mole) of gamma-dimethylaminopropyl chloride hydrochloride dissolved in 20 ml. of water containing 13.2 parts (0.2 mole) of 85% potassium hydroxide. The stirred reaction mixture was heated at 75–80° C. for 24 hours, cooled to 25° C. and 500 ml. of water added. After stirring for an additional half hour, the mixture was extracted with 500 ml. of chloroform, the chloroform extract washed with water until neutral to litmus and dried over sodium sulfate. The chloroform was removed in vacuo at 80–90° C. The amber oil so obtained analyzed 11.44% nitrogen and 13.90% sulfur as compared to 11.85% nitrogen and 13.57% sulfur calculated for $C_{12}H_{16}N_2OS$.

CLASS 2.—HALOGEN SUBSTITUTED BENZENE NUCLEUS

Example 12

5-chloro-2-(2-dimethylaminoethylthio)benzothiazole of the structure

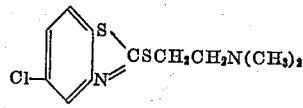

was obtained by reacting 100 parts (0.465 mole) of 5-chloromercaptobenzothiazole dissolved in 500 parts of water containing 74.5 parts (0.465 mole) of 25% caustic soda with 67 parts (0.465 mole) of 2-chloro-N,N-dimethylethylamine hydrochloride in 74.5 parts (0.465 mole) of 25% caustic soda solution. The procedure followed was the same as described in Example 8. A tan colored solid melting at 46–48° C. was obtained which was insoluble in water but soluble in the ordinary organic solvents. Analysis gave 10.96% nitrogen and 13.80% sulfur as compared to 10.27% nitrogen and 13.00% sulfur calculated for $C_{11}H_{13}ClN_2S_2$.

Example 13

5-chloro-2-(2-diethylaminoethylthio)benzothiazole of the structure

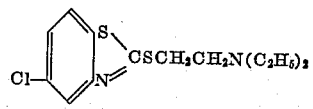

was obtained by following the procedure of Example 1 but using as a charge 50.4 parts (0.25 mole) of 5-chloro-2-mercaptobenzothiazole in 500 parts of water containing 40 parts (0.25 mole) of 25% caustic soda and reacting with 43 parts (0.25 mole) of 2-chloro-N,N-diethylethylamine hydrochlorine in 40 parts (0.25 mole) of 25% caustic soda solution. The product was dark amber in color and semi-solid in nature. It was insoluble in water but soluble in the common organic solvents. Analysis gave 9.39% nitrogen as compared to 9.31% calculated for $C_{13}H_{17}ClN_2S_2$. The hydrochloride of this compound was a cream colored solid melting at 237–238° C. after recrystallization from methanol. M.P. $(HOOC)_2 \cdot H_2O$ salt 144–146° C.

Example 14

5 - chloro - 2 - (1 - methyl - 2 - dimethylaminoethylthio) benzothiazole of the structure

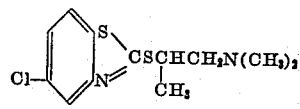

was produced by following the procedure described in Example 8 by reacting 50.4 parts (0.25 mole) of 5-chloro-2-mercaptobenzothiazole in 500 parts of water containing 40 parts (0.25 mole) of 25% caustic soda solution with 39.5 parts (0.25 mole) of 2-chloro-1-methyl-N,N-dimethylethylamine hydrochloride in 40 parts (0.25 mole) of 25% caustic soda solution. The product was a tan colored solid melting at 65–66° C. and was insoluble in water and heptane but soluble in the commonly used organic solvents. Analysis gave 9.84% nintrogen and 12.33% chlorine as compared to 9.77% nitrogen and 12.36% chlorine calculated for $C_{12}H_{15}ClN_2S_2$.

Example 15

2 - (2 - aminoethylthio) - 5 - chlorobenzothiazole of the structure

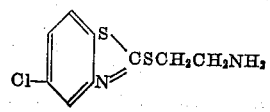

was obtained by the procedure of Example 7 while employing as a reaction charge 40.3 parts (0.2 mole) of 5-chloro-2-mercaptobenzothiazole in 200 parts of water containing 32 parts (0.2 mole) of 25% caustic soda solution and 41 parts (0.2 mole) of 2-bromoethylamine hydrobromide in 32 parts (0.2 mole) of 25% caustic soda solution. The product was a tan colored solid melting at 173–175° C. after recrystallization from ethyl alcohol. It was insoluble in water, ether and heptane but soluble in hot solvents such as acetone, benzene, chloroform, ethanol and ethyl acetate. Analysis of the product gave 10.99% nitrogen and 14.82% chlorine as compared to 11.44% nitrogen and 14.49% chlorine calculated for $C_9H_9ClN_2S_2$. It was active against *Monilinia fructicola* but was not a rust eradicant.

*Example 16*

5 - chloro - 2 - (3 - dimethylaminopropylthio)benzothiazole of the structure

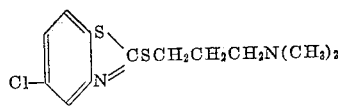

was obtained by substituting 31.6 parts (0.2 mole) of gamma-dimethylaminopropyl chloride hydrochloride for the 2-bromoethylamine hydrobromide in Example 15. The reaction mixture was stirred at 25–30° C. for 24 hours and then extracted with 300 ml. of ethyl ether. The ether extract was washed with water until neutral to litmus, dried over sodium sulfate and the ether removed in vacuo at 80–90° C. The product was an amber oil analysing 9.82% nitrogen and 12.80% chlorine as compared to 9.77% nitrogen and 12.36% chlorine calculated for $C_{12}H_{15}ClN_2S_2$.

*Example 17*

5 - chloro - 2 - (2 - morpholinoethylthio)benzothiazole of the structure

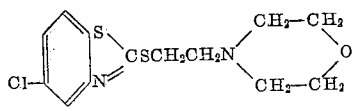

was obtained by reacting 40.3 parts (0.2 mole) of 5-chloro-2-mercaptobenzothiazole in 400 parts of water containing 32 parts (0.2 mole) of 25% caustic soda solution with 37.2 parts (0.2 mole) of 4-(2-chloroethyl)-morpholine hydrochloride containing 32 parts (0.2 mole) of 25% caustic soda solution. Again following the procedure in Example 8, the product was a tan solid, M.P. 76–77° C. Analysis gave 9.08% nitrogen, 19.96% sulfur and 10.95% chlorine as compared to 8.86% nitrogen, 20.37% sulfur and 11.23% chlorine calculated for $C_{13}H_{15}ClN_2OS_2$.

*Example 18*

5-chloro-2-(2-dibutylaminoethylthio)benzothiazole of the structure

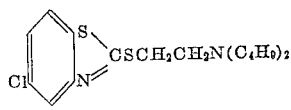

was produced by reacting 50.4 parts (0.25 mole) of 5-chloro-2-mercaptobenzothiazole in 250 parts of water containing 40 parts (0.25 mole) of 25% caustic soda solution with 57.1 parts (0.25 mole) of N-(2-chloroethyl)dibutylamine hydrochloride containing 40 parts (0.25 mole) of 25% caustic soda solution. The stirred reaction mixture was heated at 50–60° C. for 3 hours and then cooled to 5° C. The resulting solid was filtered, washed with cold water until the washings were neutral to litmus and air-dried on a porous plate at 15–20° C. The tan solid so obtained melted at 32–33° C. after recrystallization from ethyl alcohol. Analysis gave 17.53% sulfur and 10.08% chlorine as compared to 17.97% sulfur and 9.93% chlorine calculated for $C_{17}H_{25}ClN_2S_2$.

CLASS 3.—ALKOXY SUBSTITUTED BENZENE NUCLEUS

This class of new thiazoles have the common characteristic of containing an alkoxy substituent in the benzene ring of the thiazole. They are produced by methods analogous to those previously described in Classes 1 and 2.

*Example 19*

6 - ethoxy - 2 - (2 - dimethylaminoethylthio)benzothiazole, possessing the structure

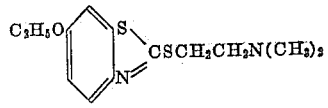

was obtained by reacting 52.8 parts (0.25 mole) of 6-ethoxy mercaptobenzothiazole in 500 parts of water containing 40 parts (0.25 mole) of 25% caustic soda solution with 36 parts (0.25 mole) of 2-chloro-N,N-dimethylethylamine hydrochloride containing 40 parts (0.25 mole) of 25% caustic soda solution. The procedure followed was that described in Example 1. The product obtained was an amber oil, insoluble in water and heptane but soluble in the common organic solvents. Analysis of the product gave 9.73% nitrogen and 22.21% sulfur as compared to 9.92% nitrogen and 22.71% sulfur calculated for $C_{13}H_{18}N_2OS_2$.

*Example 20*

6 - ethoxy - 2 - (1 - methyl - 2 - dimethylaminoethylthio)benzothiazole, possessing the structure

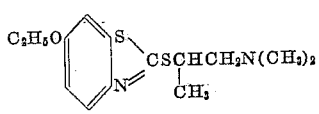

was obtained by reacting 73 parts (0.336 mole) of 6-ethoxy mercaptobenzothiazole in 400 parts of water containing 53.8 parts (0.336 mole) of 25% caustic soda solution with 53 parts (0.336 mole) of 2-chloro-1-methyl-N,N-dimethylethylamine hydrochloride containing 53.8 parts (0.336 mole) of 25% caustic soda solution. The procedure followed again was that described in Example 1. An amber oil was obtained possessing the same solubility characteristics as mentioned in the previous example. Analysis gave 9.75% nitrogen and 21.87% sulfur as compared to 9.45% nitrogen and 21.63% sulfur calculated for $C_{14}H_{20}N_2OS_2$.

*Example 21*

6 - ethoxy - 2 - (2 - diethylaminoethylthio)benzothiazole of the structure

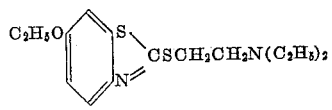

was obtained as an amber liquid of the same solubility characteristics as the other products described, by reacting the same charge as that described in Example 19 and by operating by the same procedure with the sole exception that 43 parts (0.25 mole) of 2-chloro-N,N-diethylethylamine hydrochloride was employed in place of the 2-chloro-N,N-dimethylethylamine hydrochloride. Analysis of the product gave 9.09% nitrogen and 19.99% sulfur as compared to 9.02% nitrogen and 20.66% sulfur calculated for $C_{15}H_{22}N_2OS_2$. The hydrochloride of this compound was a cream colored solid melting at 145–146° C. M.P. $(HOOC)_2 \cdot 2H_2O$ salt 68–70° C.

Example 22

6-ethoxy-2-(2-aminoethylthio)benzothiazole of the structure

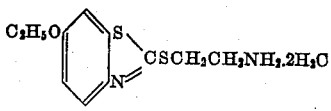

may be used as an intermediate to prepare the compound of Example 19 by condensation with formaldehyde and formic acid. The intermediate was obtained by reacting 42.2 parts (0.2 mole) of 6-ethoxy 2-mercaptobenzothiazole in 200 parts of water containing 32 parts (0.2 mole) of 25% caustic soda solution with 41 parts (0.2 mole) of 2-bromoethylamine hydrobromide containing 32 parts (0.2 mole) of 25% caustic soda solution. The mixture of reactants was well agitated and heated to 70–80° C. for about 24 hours and then allowed to cool to room temperature. To the stirred mixture 300 parts of diethyl ether were added and stirring continued for about a half hour. Thereupon the precipitate was separated by filtration, washed with water until neutral to litmus and air dried. The crystalline product melted at 138–140° C. and on analysis was found to contain 9.54% nitrogen as compared to 9.65% calculated for $C_{11}H_{14}N_2OS_2 \cdot 2H_2O$.

Example 23

6-ethoxy-2-(3-dimethylaminopropylthio)benzothiazole of the structure

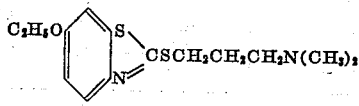

was prepared by reacting 42.2 parts (0.2 mole) of 6-ethoxy mercaptobenzothiazole in 200 parts of water containing 32 parts (0.2 mole) of 25% caustic soda solution with 31.6 parts (0.2 mole) of gamma-dimethylaminopropyl chloride hydrochloride containing 32 parts (0.2 mole) of 25% caustic soda solution. The procedure was that described in Example 1 except that the reaction mixture was stirred at 25–30° C. for 24 hours. The product was an amber semi-solid analyzing 9.14% nitrogen and 21.70% sulfur as compared to 9.45% nitrogen and 21.63% sulfur calculated for $C_{14}H_{20}N_2OS_2$.

Example 24

2-(3-aminopropylthio)-6-ethoxybenzothiazole of the structure

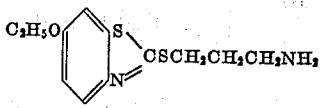

was obtained by reacting 52.8 parts (0.25 mole) of 6-ethoxy mercaptobenzothiazole in 500 parts of water containing 40 parts (0.25 mole) of 25% caustic soda solution with 54.8 parts (0.25 mole) of

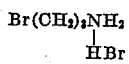

in 40 parts (0.25 mole) of 25% caustic soda solution. The procedure followed that in Example 6. An amber oil was obtained analyzing 23.42% sulfur as compared to 23.89% calculated for $C_{12}H_{16}N_2OS_2$. In spore germination tests the compound excellently controlled *Stemphylium sarcinaeforme* and *Monilinia fructicola* although it was without rust eradicant properties.

Example 25

6-ethoxy-(2-dibutylaminoethylthio)benzothiazole of the structure

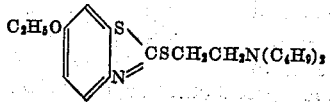

was obtained by reacting 40.8 parts (0.193 mole) of 6-ethoxy 2-mercaptobenzothiazole in 250 parts of water containing 31 parts (0.193 mole) of 25% caustic soda solution with 44 parts (0.193 mole) of N-(2-chloroethyl) dibutylamine hydrochloride in 31 parts (0.193 mole) of 25% caustic soda solution. The reaction mixture was heated at 50–60° C. for 3 hours, cooled and extracted with 350 ml. of chloroform. The chloroform solution was washed with water until the washings were neutral to litmus and dried over sodium sulfate. The chloroform was removed in vacuo at a maximum temperature of 80–90° C. at 1–2 mm. The dark amber oil so obtained analyzed 7.67% nitrogen and 17.70% sulfur as compared to 7.64% nitrogen and 17.49% sulfur calculated for $C_{19}H_{30}N_2OS_2$.

CLASS 4.—HYDROCARBON SUBSTITUTED BENZENE NUCLEUS

Example 26

2-(2-dimethylaminoethylthio)-6-phenylbenzothiazole having the structure

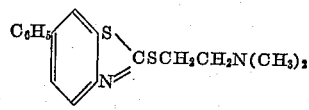

was obtained by reacting 48.6 parts (0.2 mole) of 6-phenyl mercaptobenzothiazole in 500 parts of water containing 32 parts (0.2 mole) of 25% caustic soda solution with 28.8 parts (0.2 mole) of 2-chloro-N,N-dimethylethylamine hydrochloride in 32 parts (0.2 mole) of 25% caustic soda solution. The mixture was heated to 50–60° C. with stirring for about 3 hours and then cooled to about 10° C., filtered, and the residue washed with water until the wash waters were neutral to litmus. The tan colored solid was then air dried at room temperature and was found to have a melting point of 41–43° C. The crystals were insoluble in water, ether and heptane, soluble in acetone, benzene, chloroform and ethanol but only slightly soluble in ethyl acetate. Analysis gave 8.79% nitrogen and 19.87% sulfur as compared to 8.91% nitrogen and 20.39% nitrogen calculated for $C_{17}H_{18}N_2S_2$.

Example 27

2-N,N-dimethylaminoethylthio-6,7-dihydro-4,5-benzobenzothiazole of the structure

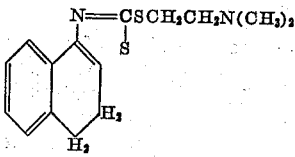

was obtained by reacting 54.9 parts (0.25 mole) of 2-mercapto-6,7-dihydro-4,5-benzobenzothiazole (described in copending application Serial No. 493,548, filed March 10, 1955) in 500 parts of hot water containing 40 parts (0.25 mole) of 25% aqueous sodium hydroxide with 36 parts (0.25 mole) of beta-dimethylaminoethyl chloride hydrochloride in 40 parts (0.25 mole) of 25% aqueous sodium hydroxide. The stirred reaction mixture was heated at 50–60° C. for about 5 hours, then cooled to about 25° C. and extracted with 500 parts of ethyl ether. The ethereal solution was washed with water until the washings were neutral to litmus, then dried over anhydrous sodium sulfate and the ether removed in vacuo. The yield of the product, an amber colored oil of the formula set forth above, was 82.5% of theory. Analysis gave 9.42% nitrogen and 22.14% sulfur compared to 9.65% nitrogen and 22.08% sulfur calculated for $C_{15}H_{18}N_2S_2$.

Example 28

4 - methyl - 2 - (2 - dimethylaminoethylthio)benzothiazole of the structure

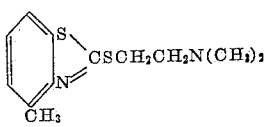

was obtained by reacting 45.3 parts (0.25 mole) of 4-methyl mercaptobenzothiazole in 500 parts of water containing 40 parts (0.25 mole) of 25% sodium hydroxide solution with 36 parts (0.25 mole) of 2-chloro-N,N-dimethylethylamine hydrochloride in 40 parts (0.25 mole) of 25% sodium hydroxide solution. The reaction procedure followed was the same as that followed in Example 1. The product obtained was an amber oil with solvent characteristics common to the family of products described. Analysis of the product gave 11.08% nitrogen and 25.20% sulfur as compared to 11.10% nitrogen and 25.41% sulfur calculated for $C_{12}H_{16}N_2S_2$.

Example 29

2 - (2 - diethylaminoethylthio)naphtho[2,3]thiazole of the structure

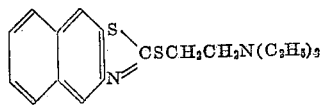

was obtained by the procedure of Example 1 but employing as a reaction charge 54.4 parts (0.25 mole) of 2-mercapto naphtho[2,3]thiazole dissolved in 500 parts of water containing 40 parts (0.25 mole) of 25% caustic soda and 43 parts (0.25 mole) of 2-chloro-N,N-diethylethylamine hydrochloride in 40 parts (0.25 mole) of 25% caustic soda solution. The product was an amber oil analyzing 8.87% nitrogen and 20.11% sulfur as compared to 8.85% nitrogen and 20.26% sulfur calculated for $C_{17}H_{20}H_2S_2$.

Further examples belonging to the aforesaid classes were prepared following the methods heretofore outlined. The reactions were effected by adding an aqueous solution of the 2-chloroethylamine to a stirred aqueous solution of the sodium salt of the mercaptothiazole and stirring at room temperature. The solid reaction products (Examples 30 and 34) were then filtered from solution, washed and dried. Where the product was liquid it was extracted from the aqueous reaction mixture by a water immiscible solvent, as for example ether, the ether solution washed thoroughly and the ether removed in vacuo. The temperature of the residue was kept below about 90° C. during the removal of the solvent to yield the free base. Where desired the base may be converted to a salt.

In this connection mono salts form from oxalic acid. Analysis showed that the oxalates described in Examples 3, 13 and 21 were mono salts.

Further examples of new compounds are summarized in the table below. All these compounds may be represented by the general formula $MSCH_2CH_2A$ where M is the thiazolyl radical and A the amino substituent. In the table, under the heading of M, B represents the 2-benzothiazolyl radical,
5–C represents the 5-chloro-2-benzothiazolyl radical,
6–E represents the 6-ethoxy-2-benzothiazolyl radical and
4–E represents the 4-ethoxy-2-benzothiazolyl radical.

TABLE

| Example No. | M | A | Yield, percent | M.P. | Analysis Found, percent | Analysis Calcd., percent |
|---|---|---|---|---|---|---|
| 30 | 5–C | N[CH(CH₃)₂]₂ | 97.5 | 72–73° C | N 8.4 / S 19.5 | 8.5 / 19.5 |
| 31 | 6–E | N[CH(CH₃)₂]₂ | 97.6 | amber oil | N 8.4 / S 19.2 | 8.3 / 18.9 |
| 32 | B | N[CH(CH₃)₂]₂ | 98.5 | do | N 9.5 / S 10.5 | 9.5 / 10.5 |
| 33 | B | NHC(CH₃)₃ | 95.0 | do | N 10.5 / S 24.0 | 10.5 / 24.1 |
| 34 | 5–C | NHC(CH₃)₃ | 91.0 | 194–195° C | N 9.2 / S 21.2 | 9.3 / 21.3 |
| 35 | 6–E | NHC(CH₃)₃ | 69.0 | amber oil | N 9.0 / S 9.8 | 9.0 / 9.9 |
| 36 | 4–E | N(CH₃)₂ | 81.6 | do | N 9.8 / S 22.4 | 9.0 / 22.7 |
| 37 | 4–E | NHC(CH₃)₂ | 71.0 | do | N 9.0 / S 20.9 | 9.0 / 20.7 |
| 38 | 4–E | N(C₂H₅)₂ | 77.5 | do | N 9.1 / S 20.6 | 9.0 / 20.7 |
| 39 | B | NHCH(CH₃)₂ | 92.0 | do | N 11.2 | 11.1 |
| 40 | 6–E | NHCH(CH₃)₂ | 68.9 | do | N 9.3 | 9.5 |

6-amino-2-(2-diethylaminoethylthio)benzothiazole of the structure

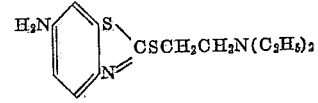

was prepared but it lacked significant fungicidal properties. The compound was an amber oil analyzing 14.75% nitrogen and 22.92% sulfur as compared to 14.93% nitrogen and 22.79% sulfur calculated for $C_{13}H_{19}N_3S_2$.

Similarly, 2 - (2-diethylaminoethylthio)-6-nitrobenzothiazole having the structure

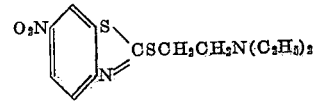

was prepared and also found to lack significant fungicidal properties. A solid product was obtained which, after recrystallization from ethyl alcohol, melted at 71–72° C. Analysis of the product gave 20.48% sulfur as compared to 20.59% calculated for $C_{13}H_{17}N_3O_2S_2$. This compound was toxic to plants, especially bean plants on contact with the foliage at 0.5% concentration.

From the plurality of examples set forth it is apparent that a wide range of products fall within the range of the invention, since more than one substituting group of the number shown, and also of other, may be inserted in the benzene nucleus and other halogen alkyl derivatives, than methyl and ethyl derivatives of ethyl amine are useable.

The utility of the products disclosed herein as fungicides is well illustrated by the following examples of application as effective in the control of wheat rust.

In demonstrating the effectiveness as fungicides, a rust susceptible variety of wheat (Seneca) was planted in small clay pots filled with soil. About ten seeds preferably are normally planted in each pot so to insure availability of about five uniform plants for the test. The pots are then held in a greenhouse at about 75° F. and watered daily until the seedlings are six days old. Thereupon the seedlings were sprayed with water by means of an atomizer and "bloom" was removed from the leaves by gentle rubbing. Then rust spores of the organism *Puccinia rubigo-vera-tritici* were transferred to the leaves which were well infected by rubbing the spores up and down the leaves on both sides thereof. Following inoculation, the plants were sprayed with a fine mist of water and placed in incubation chambers where they are held for 36–48 hours at approximately 70° F. with humidity 100%. Four days after inoculation with rust spores, the plants were sprayed with solutions of the chemical product under test. The solutions were prepared in concentrations of from 1 to 5 parts of the various chemicals to 1000 parts of water, which may contain a small quantity (5 parts) of acetone, or other solvent, if the chemical is not soluble in water. A small quantity of a suitable spreading or wetting agent preferably is also present. The compounds may be applied in the form of emulsions or even wettable powders as well as dispersions and solutions.

The infested plants are sprayed in duplicate tests using 10 cc. of the test solution per pot. After treatment as described, the pots are held in the greenhouse for a week and then examined and graded as to the number and size of pustules formed on the leaves. Tested in the manner described, and employing the products of Examples 1, 2, 3, 4, 9, 11, 12, 13, 14, 16, 17, 18, 19, 20, 21, 23, 25, 26, 27, 28 and 29, which are taken as products exemplifying the invention, and using concentrations of the test agents varying from 0.1 to 0.5% by weight (1 to 5 parts per 1000), good results as controllers and eradicants of wheat rust were realized. Also there was from none to very slight injury of the leaves of the plants so the products are not phytotoxic as well as being good fungicides. The compounds comprise efficient nematocides, outstanding examples being the products of Examples 1, 12 and 20.

It is intended to cover all changes and modifications of the examples of the invention herein chosen for purposes of disclosure which do not constitute departures from the spirit and scope of the invention.

What is claimed is:

1. The method of protecting from fungi which comprises applying to the area to be protected a composition containing as the essential active ingredient in effective concentration a thiazole of the composition $[(MXE)_yA]_z$ where M represents a thiazole nucleus in which vicinal carbon atoms are part of a carbocyclic radical containing aromatic double bonds, said carbocylic radical containing at least six but not more than twelve carbon atoms and selected from the group consisting of hydrocarbon, lower alkoxy substituted hydrocarbon and halogen substituted hydrocarbon carbocyclic radicals, X represents a member of the group consisting of oxygen and sulfur, E represents an alkylene radical containing at least two but not more than three carbon atoms, A represents an amino radical selected from the group consisting of $NH_2$, mono lower alkylamino, di(lower alkyl)amino and amino radicals in which the nitrogen is part of a heterocyclic ring and $y$ and $z$ represents integers from 1 to 2.

2. A fungicide composition comprising a carrier and a small amount sufficient to exert toxicity to cereal rusts of 5-chloro-2-(2-dimethylaminoethylthio)benzothiazole.

3. A fungicide composition comprising a carrier and a small amount sufficient to exert toxicity to cereal rusts of 5-chloro-2-(2-dimethylaminoethylthio)benzothiazole.

4. A fungicide composition comprising a carrier and a small amount sufficient to exert toxicity to cereal rusts of 6-ethoxy-2-(2-dimethylaminoethylthio)benzothiazole.

5. A fungicide composition comprising a carrier and a small amount sufficient to exert toxicity to cereal rusts of 6-ethoxy-2-(2-dimethylaminoethylthio)benzothiazole.

6. A method of treating wheat to control wheat rust which comprises treating the growing wheat with a composition containing as the essential active ingredient a thiazole of the composition 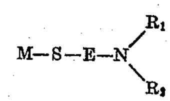 where M represents a thiazole nucleus in which vicinal carbon atoms are part of a carbocyclic radical containing aromatic double bonds, said carbocyclic radical consisting in a hydrocarbon group containing at least six but less than thirteen carbon atoms, E represents an alkylene radical containing at least two but not more than three carbon atoms and $R_1$ and $R_2$ represent lower alkyl groups.

7. A method of treating wheat to control wheat rust which comprises treating the growing wheat with a composition containing as the essential active ingredient a thiazole of the composition 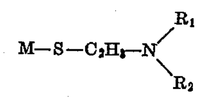 where M represents 5-chloro-2-benzothiazolyl and $R_1$ and $R_2$ represent lower alkyl groups.

8. A method of treating wheat to control wheat rust which comprises treating the growing wheat with a composition containing as the essential active ingredient a thiazole of the composition 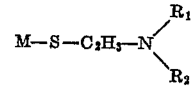 where M represents 6-lower alkoxy 2-benzothiazolyl and $R_1$ and $R_2$ represent lower alkyl groups.

9. A fungicide composition toxic to the causative agent of wheat rust comprising a carrier from which an active mercaptobenzothiazole component is released upon evaporation having dispersed therein an effective concentration of a mercaptobenzothiazole compound having the structure 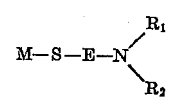 wherein M represents a chloro substituted 2-benzothiazolyl radical, E represents an alkylene radical containing at least two but not more than three carbon atoms and $R_1$ and $R_2$ represent lower alkyl groups.

10. A fungicide composition toxic to the causative agent of wheat rust comprising a carrier from which an active mercaptobenzothiazole component is released upon evaporation having dispersed therein an effective concentration of a mercaptobenzothiazole compound having the structure 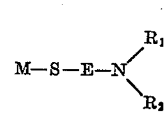 wherein M represents a mono lower alkoxy-2-benzothiazolyl radical, E represents an alkylene radical containing at least two but not more than three carbon atoms and $R_1$ and $R_2$ represent lower alkyl groups.

11. A fungicide composition toxic to the causative agent of wheat rust comprising a carrier from which an active mercaptobenzothiazole component is released upon evaporation having dispersed therein an effective concentration of a mercaptobenzothiazole compound having the structure wherein M represents 5-chloro-2-benzothiazolyl and $R_1$ and $R_2$ represent lower alkyl groups.

12. A fungicide composition toxic to the causative agent of wheat rust comprising a carrier from which an active mercaptobenzothiazole component is released upon evaporation having dispersed therein an effective concentration of a mercaptobenzothiazole compound having the structure

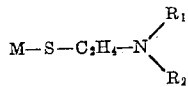

wherein M represents 6-lower alkoxy 2-benzothiazolyl and $R_1$ and $R_2$ represent lower alkyl groups.

References Cited in the file of this patent

UNITED STATES PATENTS

| | | |
|---|---|---|
| 1,996,011 | Messer | Mar. 26, 1935 |
| 2,010,059 | Coleman | Aug. 6, 1935 |
| 2,087,200 | Clifford | July 13, 1937 |
| 2,221,147 | Mathes | Nov. 12, 1940 |
| 2,358,420 | Kurlychek | Sept. 19, 1944 |
| 2,358,716 | Jones et al. | Sept. 19, 1944 |
| 2,411,253 | Flenner et al. | Nov. 19, 1946 |
| 2,424,175 | Jones et al. | July 15, 1947 |
| 2,692,881 | Steiger | Oct. 26, 1954 |

OTHER REFERENCES

McNew: Agr. Chem., vol. 7, April 1952, pp. 54–56, 143–155.

UNITED STATES PATENT OFFICE
CERTIFICATE OF CORRECTION

Patent No. 2,912,357                                           November 10, 1959

Marion W. Harman et al

It is hereby certified that error appears in the printed specification of the above numbered patent requiring correction and that the said Letters Patent should read as corrected below.

Column 3, line 30, for "$C_{13}H_{18}S_2$." read -- $C_{13}H_{18}N_2S_2$. --; column 5, line 44, for "produce" read -- product --; line 59, for "30.0 parts" read -- 30.3 parts --; column 6, line 38, for "hydrochlorine" read -- hydrochloride --; line 64, for "nintrogen" read -- nitrogen --; column 11, line 61, for "$C_{17}H_{20}H_2S_2$." read -- $C_{17}H_{20}N_2S_2$. --; column 13, line 67, for "5-chloro-2-(2-dimethylaminoethylthio)benzothiazole." read -- 5-chloro-2-(2-diethylaminoethylthio)benzothiazole. --; line 73, for "6-ethoxy-2-(2-dimethylaminoethylthio)benzothiazole" read -- 6-ethoxy-2-(2-diethylaminoethylthio)benzothiazole --; column 14, lines 19 to 21, the composition should read as shown below instead of as in the patent:

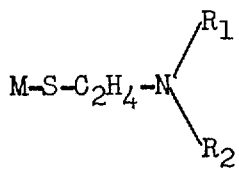

lines 30 to 32, the composition should read as shown below instead of as in the patent:

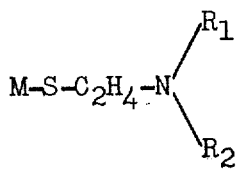

Signed and sealed this 26th day of April 1960.

(SEAL)
Attest:

KARL H. AXLINE                                    ROBERT C. WATSON
Attesting Officer                                 Commissioner of Patents